United States Patent
Harumoto et al.

(10) Patent No.: US 7,398,851 B2
(45) Date of Patent: Jul. 15, 2008

(54) METHOD AND APPARATUS FOR MONITORING VEHICLE STATUS

(75) Inventors: Satoshi Harumoto, Hyogo (JP); Toshitaka Yamato, Hyogo (JP); Hiroshi Takeuchi, Hyogo (JP); Yoshihiko Maeno, Hyogo (JP); Kazuhiro Sakiyama, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 241 days.

(21) Appl. No.: 11/135,440

(22) Filed: May 24, 2005

(65) Prior Publication Data

US 2005/0269149 A1 Dec. 8, 2005

(30) Foreign Application Priority Data

Jun. 1, 2004 (JP) ............................. 2004-163487

(51) Int. Cl.
*B60K 28/10* (2006.01)
(52) U.S. Cl. ..................................... 180/274
(58) Field of Classification Search ................ 180/274, 180/282; 280/735; 340/436, 437, 439; 701/29, 701/30, 34, 45
See application file for complete search history.

(56) References Cited

U.S. PATENT DOCUMENTS 5,484,166 A * 1/1996 Mazur et al. ................ 280/735

FOREIGN PATENT DOCUMENTS

| JP | A 11-175856 | 7/1999 |
|---|---|---|
| JP | A 2001-184578 | 7/2001 |
| JP | A 2002-323410 | 11/2002 |

* cited by examiner

*Primary Examiner*—Christopher Ellis
*Assistant Examiner*—Robert A. Coker
(74) *Attorney, Agent, or Firm*—Oliff & Berridge, PLC

(57) ABSTRACT

An apparatus for monitoring a status of a vehicle, which determines whether the vehicle is in an abnormal status by comparing an impact value detected by a detecting unit that detects an impact on the vehicle with a predetermined threshold value, includes a first determining unit that determines whether the impact value detected is over at least one threshold value from among a plurality of threshold values; and a second determining unit that, when the first determining unit determines that the impact value is over the at least one threshold value, continues to monitor a status of the vehicle, and determines whether the vehicle is in an abnormal status.

14 Claims, 5 Drawing Sheets

FIG.5

| DATA AND TIME | SITE | TYPE | MEASURED VALUE |
|---|---|---|---|
| 2004/4/1 10:06 | RIGHT FRONT WHEEL | VIBRATION | 500 |
| 2004/4/5 18:31 | STEERING | STEERING ERROR | 4 |
| 2004/4/6 20:52 | ENGINE | TEMPERATURE | 230 |
| ... | ... | ... | ... |

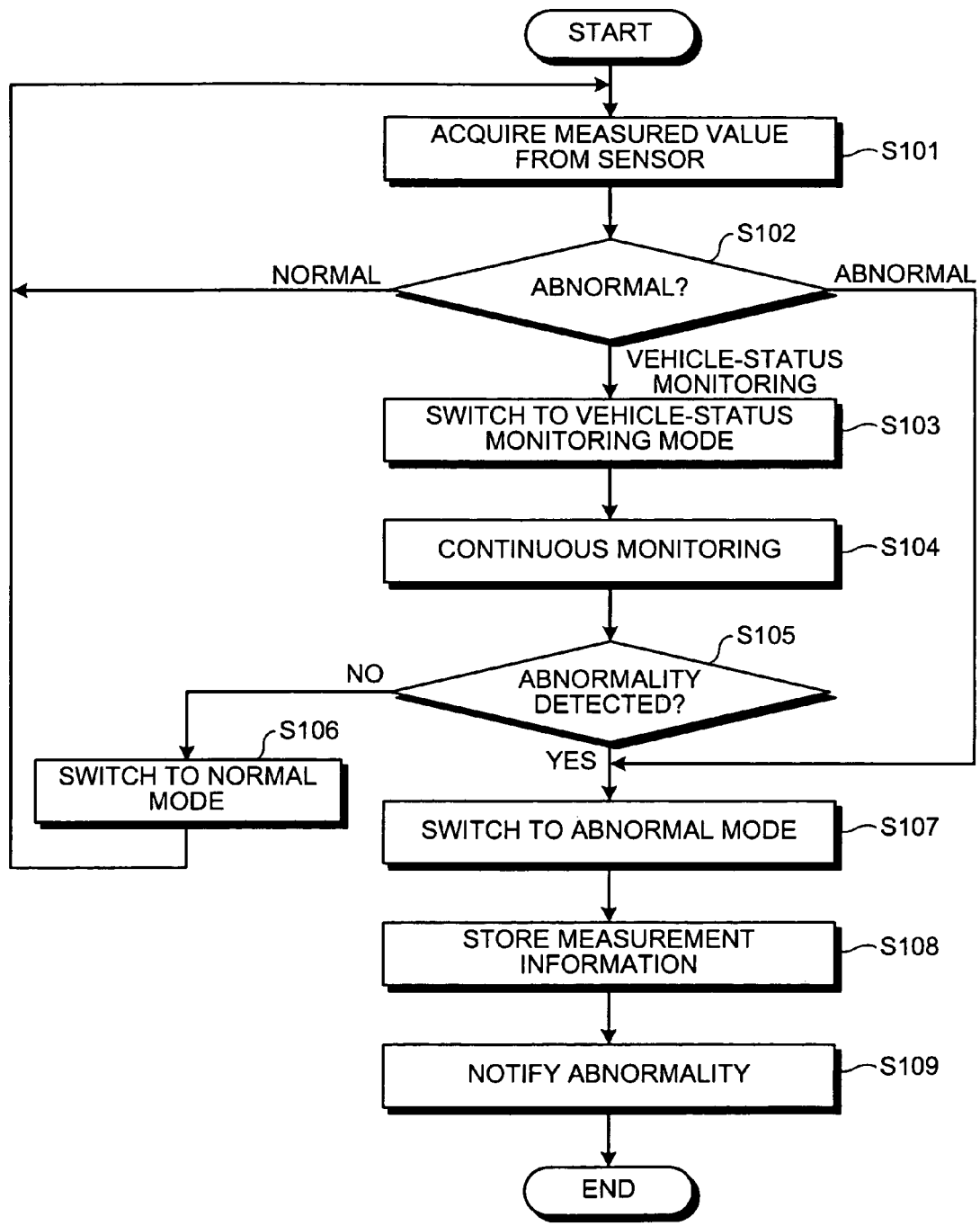

METHOD AND APPARATUS FOR MONITORING VEHICLE STATUS

BACKGROUND OF THE INVENTION

1) Field of the Invention

The present invention relates to a method and an apparatus for monitoring a vehicle status by detecting an impact on a vehicle and comparing the impact applied with a predetermined threshold value, an more particularly, to a method and an apparatus for monitoring a vehicle status, when the vehicle takes an impact, for detecting the vehicle status, determining whether the vehicle is in an abnormal status with a high precision, and allowing a quick and efficient maintenance of the vehicle.

2) Description of the Related Art

Conventionally, when a vehicle running on a road takes some sort of impact, it is a general method to detect an impact value using a sensor installed in the vehicle, and to determine whether there is a possibility that the vehicle is in an abnormal status based on the impact value detected. The vehicle is equipped with a variety of sensors including a steering-angle sensor that detects a steering angle of the vehicle, a G-sensor that detects a vibration in a direction of side to side and up and down, and an acceleration sensor that detects a change of an acceleration of the vehicle, and when any one of the sensors detects an impact value over a predetermined threshold value, a message indicating that an abnormal status occurred in the vehicle is displayed on a front panel of the vehicle (see, for example, Japanese Patent Application Laid-Open Publication No. 2001-184578).

In this case, when the impact value detected is much greater than it should be, a measure of switching a mode of the vehicle to a fail-safe mode is also carried out automatically to make assurance doubly sure on a measure for safety, notifies a driver of the vehicle of an abnormal status, and at the same time, notifies a vehicle dealer of the abnormal status to prepare a necessary part in advance, so that a quick failure recovery is carried out for sure (see, for example, Japanese Patent Application Laid-Open Publication No. 2002-323410).

However, when a vehicle takes an impact, even if it is determined whether the vehicle is in an abnormal status by simply comparing a detected value with a threshold value, as described above according to the conventional technology, a result of the determination may not indicate a status of the vehicle correctly. Generally, the threshold value is set to a considerably high value so that it is not determined that the vehicle is in an abnormal status until a strong impact is posed that a driver or a passenger of the vehicle is injured by the impact. Therefore, even if the impact value detected is lower below the threshold value, the status of the vehicle may become abnormal later. For this reason, in practice, when a vehicle takes some sort of impact, a driver of the vehicle has to monitor the status of the vehicle from that time on, and to determine whether the vehicle is in an abnormal status.

In addition, when it is determined that the vehicle is in an abnormal status, the driver has to take the vehicle to a car body shop such as a car dealer, or when the abnormal status is not conspicuous, has to make a test again, resulting in a considerable effort and a considerable time required for determining whether the vehicle is in an abnormal status.

SUMMARY OF THE INVENTION

It is an object of the present invention to solve at least the above problems in the conventional technology.

An apparatus for monitoring a status of a vehicle according to one aspect of the present invention, which determines whether the vehicle is in an abnormal status by comparing an impact value detected by a detecting unit that detects an impact on the vehicle with a predetermined threshold value, includes a first determining unit that determines whether the impact value detected is over at least one threshold value from among a plurality of threshold values; and a second determining unit that, when the first determining unit determines that the impact value is over the at least one threshold value, continues to monitor a status of the vehicle, and determines whether the vehicle is in an abnormal status.

A method of monitoring a status of a vehicle according to another aspect of the present invention, which is for determining whether the vehicle is in an abnormal status by comparing an impact value detected by a detecting unit that detects an impact on the vehicle with a predetermined threshold value, includes a first determining including determining whether the impact value detected is over at least one threshold value from among a plurality of threshold values; and a second determining including continuing, when the first determining unit determines that the impact value is over the at least one threshold value, to monitor a status of the vehicle, and determining whether the vehicle is in an abnormal status.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a table of data structure for illustrating an example of information included in actual measurement data; and FIG. 6 is a flowchart of a process procedure for the vehicle-status monitoring apparatus shown in FIG. 4.

DETAILED DESCRIPTION

Exemplary embodiments of a method and an apparatus for monitoring a status of a vehicle according to the present invention will be explained in detail below with reference to the accompanying drawings. Although an optional number of threshold values can be used in a primary determination according to the present invention, a case in which two threshold values are used in the primary determination is explained as an example.

Figure 1:
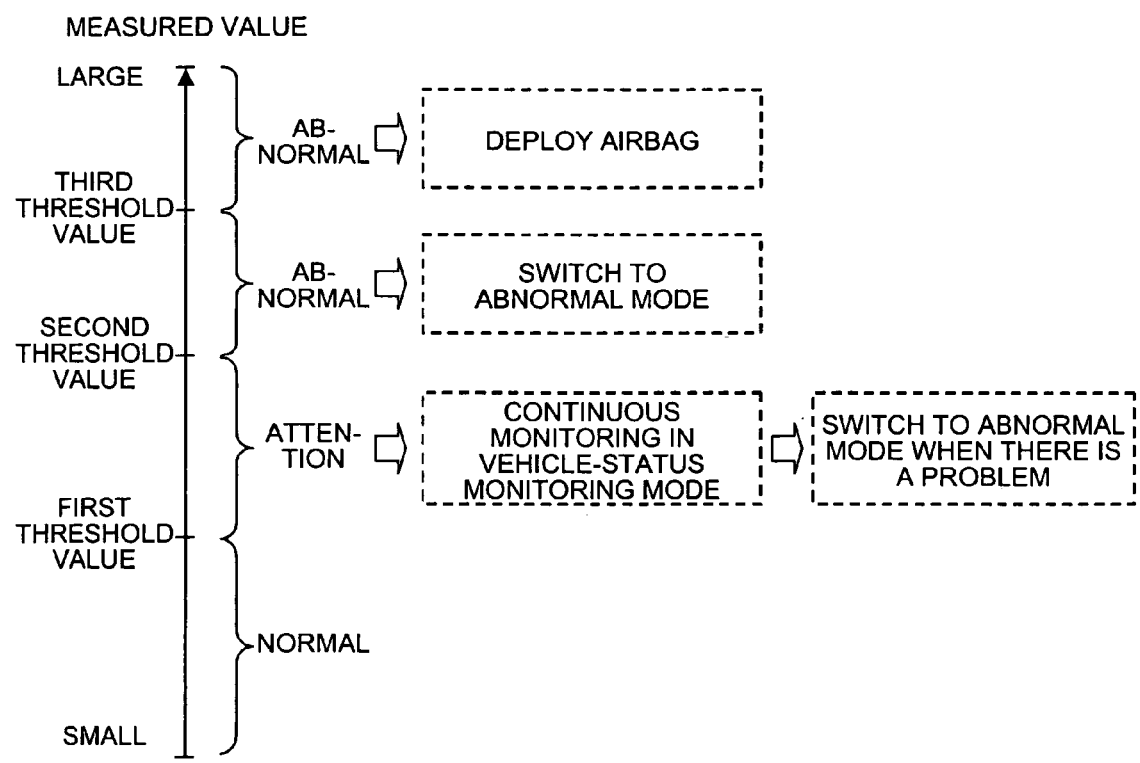
FIG. 1 is a schematic diagram for illustrating a concept of vehicle-status monitoring method when a measured value from a G-sensor is detected.

In an explanation of a concept of a vehicle-status monitoring method according to the present invention, a measured value from a G-sensor is detected as an example. The G-sensor detects a magnitude and a direction of an acceleration side by side and up and down. FIG. 1 is a schematic diagram for illustrating a concept of vehicle-status monitoring method when a measured value from the G-sensor is detected As shown in the figure, when the measured value from the G-sensor is detected, a primary determination is carried out with a first threshold value and a second threshold value. A main feature of the vehicle-status monitoring method according to the present invention is that a determination of a measured value of a sensor is carried out using a plurality of threshold values.

When the measured value from the G-sensor is below the first threshold value, such as when the vehicle is just enters a highway junction or when the vehicle makes a light contact with a tire stopper at a parking lot, the vehicle is considered to be in a normal status, and no special process is carried out.

When the measured value from the G-sensor is over a third threshold value in a secondary determination, it is determined that an impact as hard as a bump of a driver or a passenger of the vehicle to a front glass of the vehicle is posed on the vehicle, and an airbag is deployed. At the same time, an accident of the vehicle is reported to a control center and the like.

On the other hand, when the measured value from the G-sensor is between the second threshold value and the third threshold value, in other words, the impact posed on the vehicle is not such an impact as a bump of the driver or the passenger to the front glass, but a considerable impact such as an impact posed on a bottom of the vehicle when the vehicle is stuck in a side gutter of a road, a mode of the vehicle is switch to an abnormal mode. In the abnormal mode, a message indicating an event of an abnormality is displayed on a display of a navigation system and the like to carry out a notification to the driver, and a restriction such as a speed restriction is put on the vehicle for securing a safety in driving. In addition, for a future repair and a future maintenance, the measured value from the G-sensor and a variety of pieces of information indicating a status of the vehicle at that time, such as a driving speed, are stored in a storing unit.

In this manner, in the vehicle-status monitoring method according to the present invention, when it is determined that the vehicle is in an abnormal status for sure, the mode of the vehicle is immediately switched to the abnormal mode to secure a safety of the vehicle.

When the measured value from the G-sensor is between the first threshold value and the second threshold value, it is determined that there is a possibility of having a damage by a hitting of a part of the vehicle to a curb, and the mode of the vehicle is switched to the vehicle-status monitoring mode. In the vehicle-status monitoring mode, measured values of a variety of sensors equipped in the vehicle are continuously monitored so that the secondary determination whether the vehicle is in an abnormal status is carried out.

Figure 2:
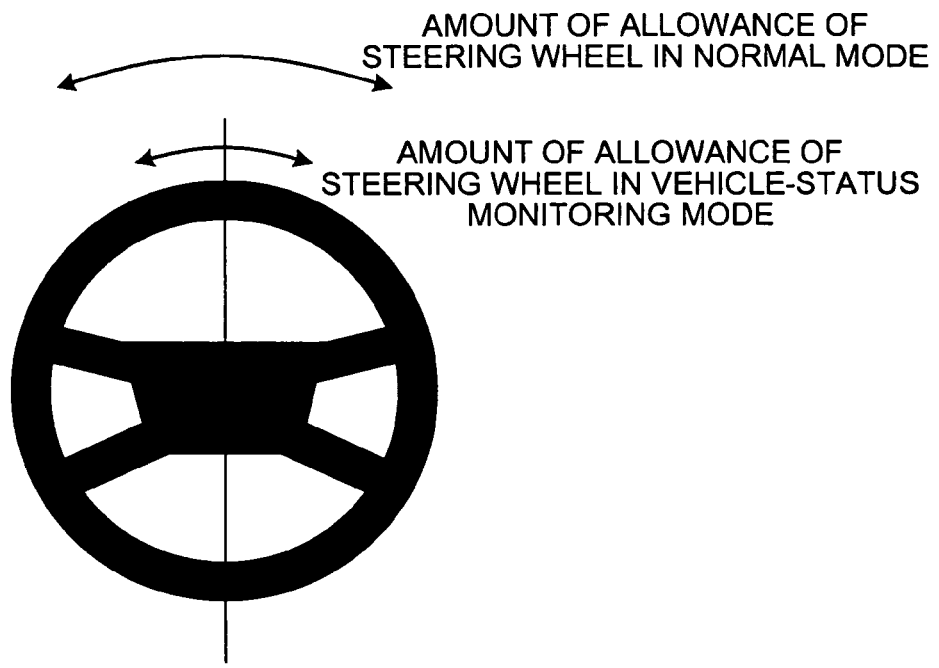
FIG. 2 is a schematic diagram for illustrating an example of monitoring an amount of allowance of a steering wheel.

For example, when it is confirmed that the vehicle is driving straight from the measured value of the G-sensor, an allowance of a steering wheel is reduced by a steering-mechanism control unit to measure a steering angle of the steering wheel correctly, as shown in FIG. 2, and then, a measured value regarding to the steering angle of the steering wheel is acquired by a steering-angle sensor. With an ideal model, the steering angle at a time of a straight driving is about ±3° from the center. Therefore, if a measurement shows that the steering angle is more than ±10° continuously, it is considered that the steering wheel is distorted, and the mode of the vehicle is switched to the abnormal mode.

Figure 3:
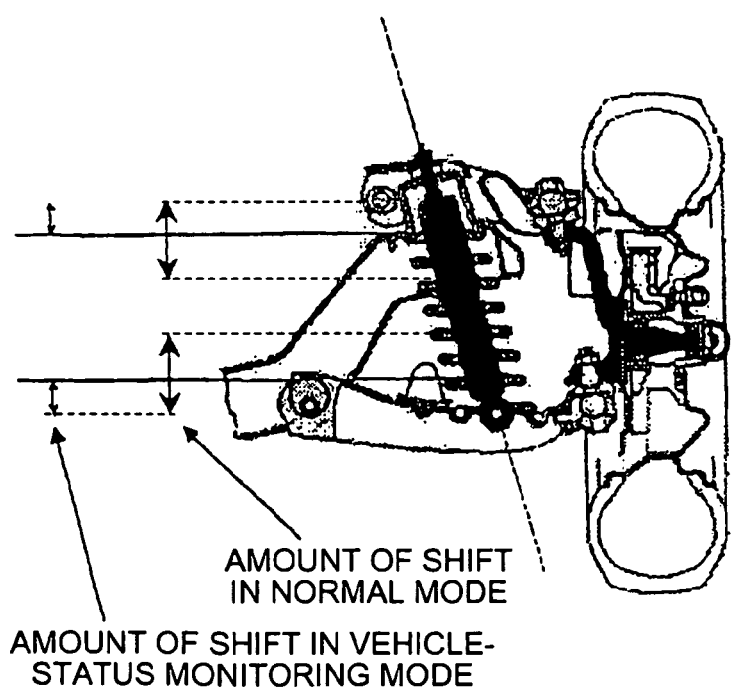
FIG. 3 is a schematic diagram for illustrating an example of monitoring an amount of shift of a suspension.

In addition, as shown in FIG. 3, a suspension of the vehicle is firmly tuned to make it easy to receive a vibration from a road surface, and a vibration frequency of the suspension is acquired by a vibration sensor of the suspension. The vibration frequency acquired by the vibration sensor is compared with an ideal model. When the vibration frequency acquired by the vibration sensor is far over a normal value, the mode of the vehicle is switched to the abnormal mode. In the same manner, a decrease of an engine oil or a brake liquid is monitored to check an occurrence of an abnormality in each part of the vehicle.

Another main feature of the present invention is that, when it is not clear that the vehicle is in an abnormal status, the status of the vehicle is continuously monitored to carry out a determination whether the vehicle is in an abnormal status. In this manner, with the vehicle-status monitoring method according to the present invention, it is possible to determine whether the vehicle is in an abnormal status with a high precision.

In addition, when the mode of the vehicle is switched to the vehicle-status monitoring mode, the measured value from the G-sensor and a variety of pieces of information on a status of the vehicle at that time, such as a driving speed, are stored in the storing unit so that a future repair or a future maintenance is carried out quickly.

According to the present embodiment, two threshold values are used in the primary determination. However, the threshold value can be divided into multiple steps by finely classifying an abnormality of the vehicle with more threshold values set over the second threshold value, so that a response according to a level of significance of the abnormality can be carried out. Furthermore, a threshold value can be set between the first threshold value and the second threshold value, so that a content of a vehicle-status monitoring can be changed according to a magnitude of the measured value.

Although the measured value from the G-sensor is used for the primary determination in the present example, the vehicle-status monitoring method according to the present embodiment is not limited to this. A variety of measured values from another sensor, such as a vibration sensor of a suspension, can also be used for the primary determination.

Figure 4:
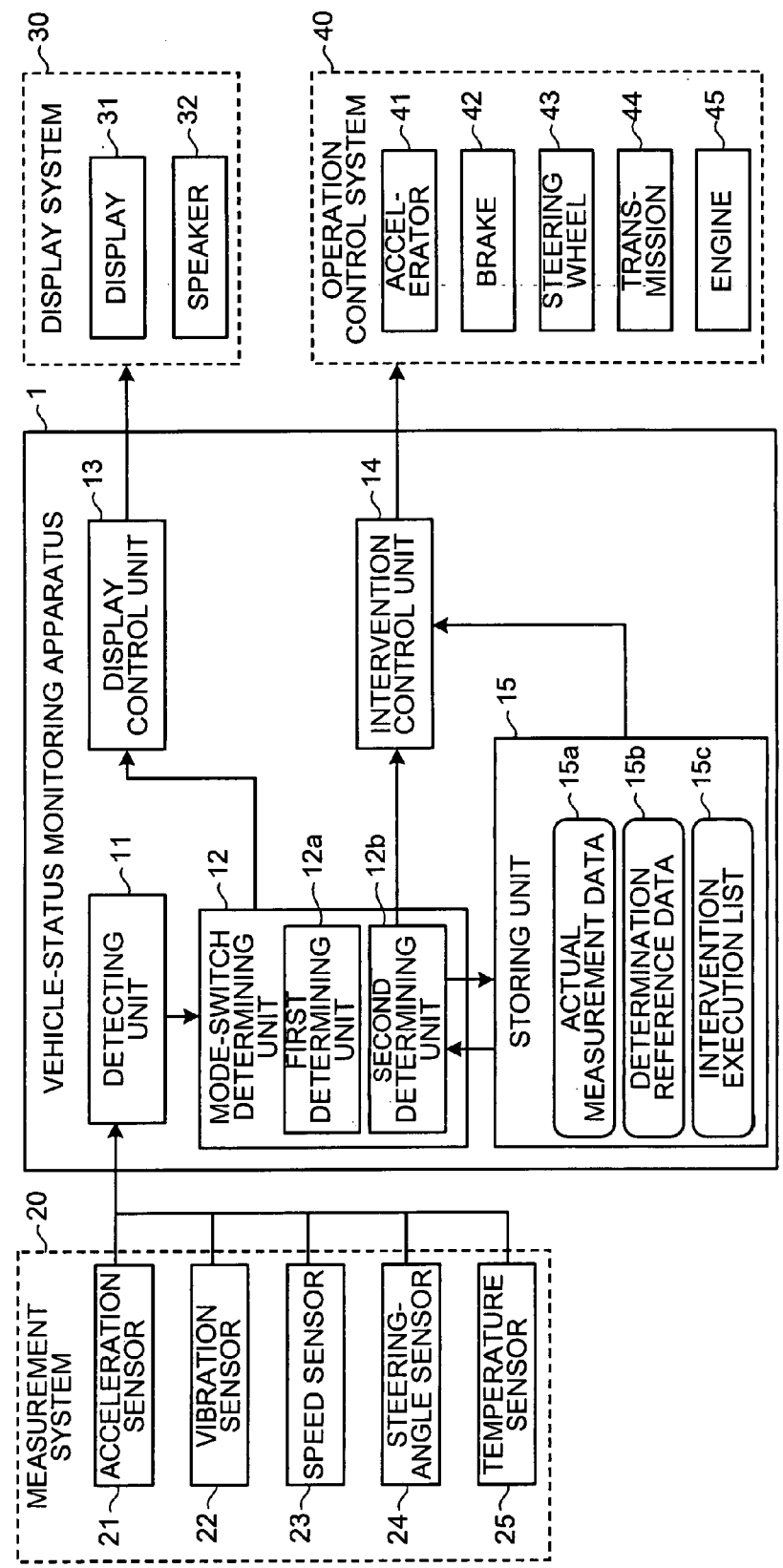
FIG. 4 is a block diagram of a vehicle-status monitoring apparatus according to an embodiment of the present invention.

FIG. 4 is a block diagram of a vehicle-status monitoring apparatus according to the present embodiment. As shown in the figure, the vehicle-status monitoring apparatus 1 includes a measurement system 20, a display system 30, and an operation control system 40.

The measurement system 20 is constituted with a variety of sensors that measure a variety of pieces of information required for a control of the vehicle. An acceleration sensor 21 is a sensor that detects a magnitude and a speed of an acceleration (G) of the vehicle. The acceleration sensor 21 can also measure a magnitude of an impact on the vehicle when the vehicle hits or runs on some sort of object. A vibration sensor 22 is a sensor that is installed on a suspension of the vehicle to measure a magnitude of a vibration. A speed sensor 23 is a sensor that measures a driving speed of the vehicle from a rotation speed of an axel shaft and the like. A steering-angle sensor 24 is a sensor that measures an amount of a steering by the driver. A temperature sensor 25 is a sensor that measures a temperature of a cooling water for an engine and the like. The measurement system 20 does not need to include all of these sensors, and on the contrary, can include another sensor in addition to these sensors.

The display system 30 includes a display 31 and a speaker 32, and has a function of notifying information from the vehicle-status monitoring apparatus 1 to the driver of the vehicle. The display system 30 is shared by a variety of vehicle equipments such as a navigation system (not shown).

The operation control sensor 40 is a control system that controls an operation of the vehicle. The operation control sensor 40 includes an accelerator 41, a brake 42, a steering wheel 43, a transmission 44, and an engine 45.

The vehicle-status monitoring apparatus 1 includes a detecting unit 11, a mode-switch determining unit 12, a display control unit 13, an intervention control unit 14, and a storing unit 15. The detecting unit 11 is a processing unit that detects a result of measurement by the measurement system 20, and delivers a result of detection to the mode-switch determining unit 12.

The mode-switch determining unit 12 includes a primary determining unit 12*a* and a secondary determining unit 12*b*, and performs a process of comparing information sent from the detecting unit 11 with determination reference data 15*b* to determine whether the vehicle is in an abnormal status, and switching a mode of the vehicle-status monitoring apparatus 1 based on the result of the determination. The vehicle-status monitoring apparatus 1 has three types of modes including a normal mode, a vehicle-status monitoring mode, and an abnormal mode. The mode-switch determining unit switches over these modes based on a determination of the information sent from the detecting unit 11.

The vehicle-status monitoring apparatus 1 is in the normal mode at a time of start. In the normal mode, the information sent from the detecting unit 11 to the mode-switch determining unit 12 is processed at the primary determining unit 12*a*. The primary determining unit 12*a* matches the information sent from the detecting unit 11 with the determination reference data 15*b*, can classifies the information into any one of "normal", "vehicle-status monitoring", and "abnormal".

When the primary determining unit 12*a* classifies the information sent from the detecting unit 11 into the "abnormal", the vehicle-status monitoring apparatus 1 switches to the abnormal mode. When the mode is switched from the normal mode to the abnormal mode, the display control unit 13 controls the display system 30 to display a message indicating that the vehicle is in an abnormal status and a message indicating that the driver should refrain from an abrupt acceleration or a quick operation of the steering wheel for a safety to draw the driver's attention. In addition, the intervention control unit 14 intervenes in the operation control system 40, and carries out a fail-safe step to make assurance doubly sure on a measure for safety. Furthermore, the information sent from the detecting unit 11 is stored in addition to actual measurement data 15*a*.

When the primary determining unit 12*a* classifies the information sent from the detecting unit 11 into the "vehicle-status monitoring", the vehicle-status monitoring apparatus 1 switches to the vehicle-status monitoring mode. When the mode is switched to the vehicle-status monitoring mode, a message is displayed on the display system 30 to draw the driver's attention.

When the vehicle-status monitoring apparatus 1 is switched to the vehicle-status monitoring mode, the information sent from the detecting unit 11 to the mode-switch determining unit 12 is processed at the secondary determining unit 12*b*. The secondary determining unit 12*b* continuously monitors the status of the vehicle, comparing the information sent from the detecting unit with a driving model held in the determination reference data 15*b*, and stores the information in addition to the actual measurement data 15*a*.

When all of a predetermined determination reference is normal from a result of the monitoring, the vehicle-status monitoring apparatus 1 is returned to the normal mode, and a message indicating that the vehicle-status monitoring apparatus 1 is returned to the normal mode is displayed on the display system 30. On the other hand, when any one of the predetermined determination reference is abnormal, the vehicle-status monitoring apparatus 1 is switched to the abnormal mode, and the same process as that carried out when the mode is switched from the normal mode to the abnormal mode is carried out.

When the secondary determining unit 12*b* continuously monitors the information to be sent from the detecting unit 11, the intervention control unit 14 can be configured to intervene in the operation control unit 40 to determine an abnormality of the vehicle with ease. In general, a control of suppressing a vibration or a noise is applied to a vehicle to enhance a stabilization of driving or a riding of the passenger. However, such a control makes it difficult to determine an abnormality in the status of the vehicle. For this reason, by temporarily stopping the control and changing the status of the vehicle into a status in which the vibration or the noise can be detected easily, it is possible to determine an abnormality of the vehicle with ease.

The display control unit 13 is a control unit that displays an image or a message on the display system 30 to notify a current mode of the vehicle-status monitoring apparatus 1 or a current status of the vehicle to the driver. The intervention control unit 14 is a control unit that intervenes in the operation control unit 40 to change the status of the vehicle to a desired status.

The storing unit 15 stores the actual measurement data 15*a*, the determination reference data 15*b*, and intervention execution list 15*c*. FIG. 5 is a table of data structure for illustrating an example of information included in the actual measurement data 15*a*. The actual measurement data 15*a* is for storing a variety of measured values detected at a time of the vehicle-status monitoring mode or the abnormal mode, and stores a data and time of the measurement, a site of measurement in the vehicle, a type of the measured value, and numerical value of the measured value. Furthermore, the actual measurement data 15*a* can be configured to store information indicating a status of the vehicle at a time of detecting the measured value (for example, a driving speed) in addition to the above information.

When the vehicle is taken to a dealer for a periodic inspection or a repair of a failure, the actual measurement data 15*a* is read by a reader belonging to the dealer, and used for a maintenance and the like. By using this information, a mechanic of the dealer can figure out what kind of failure has occurred to the vehicle from what kind of reason, and carry out a repair process efficiently.

The determination reference data 15*b* includes information that becomes a determination reference used for classifying the measured value by the mode-switch determining unit 12. For example, the determination reference data 15*b* includes a first threshold value and a second threshold value required for the primary determining unit 12*a* to classify the information sent from the detecting unit 11 into "normal", "vehicle-status monitoring", and "abnormal" for each type of the measured value. In addition, the determination reference data 15*b* includes a determination reference required for the secondary determining unit 12*b* to determine whether there is an abnormality by continuously monitoring the information to be sent from the detecting unit.

The intervention execution list 15*c* includes a content of the intervention in the operation control unit 40 by the intervention control unit 14 when the fail-safe step is carried out or when the secondary determining unit 12*b* carries out a continuous monitoring for each purpose.

FIG. 6 is a flowchart of a process procedure for the vehicle-status monitoring apparatus 1. The process shown in the flowchart begins when the engine of the vehicle is started, and is repeatedly executed until the engine is stopped.

As shown in the figure, the detecting unit 11 detects a result of the measurement by the measurement system 20, and delivers a value of the result of the measurement to the mode-switch determining unit 12 (Step S101). The primary determining unit 12a of the mode-switch determining unit 12 matches the measured valued acquired with the determination reference data 15b, and classifies the measured value into "normal", "vehicle-status monitoring", and "abnormal" (Step S102). When the primary determining unit 12a classifies the measured value into "normal" ("NORMAL" at S102), the vehicle-status monitoring apparatus 1 carries out no special process, and starts over from the Step S101.

When the primary determining unit 12a classifies the measured value into "vehicle-status monitoring" ("VEHICLE-STATUS MONITORING" at S102), the mode-switch determining unit carries out a process of switching the mode of the vehicle-status monitoring apparatus 1 to the vehicle-status monitoring mode, and displaying a message indicating that the mode is switched to the vehicle-status monitoring mode on the display system 30 (Step S103). Then, the secondary determining unit 12b carries out an investigation whether the vehicle is in an abnormal status, storing a variety of measured values by performing a continuous monitoring (Step S104). When the investigation shows no abnormality ("NO" at Step S105), the mode of the vehicle-status monitoring apparatus 1 is switched to the normal mode, and a message indicating that the vehicle-status monitoring apparatus 1 is switched to the normal mode is displayed on the display system 30 (Step S106). Then the process starts over from the Step S101.

On the other hand, when the investigation shows an abnormality ("YES" at Step S105), the mode of the vehicle-status monitoring apparatus 1 is switched to the abnormal mode, and an execution of processes in Steps S107 to S109 is carried out.

When the primary determining unit 12a classifies the measured value into "abnormal" ("ABNORMAL" at Step S102), or when the secondary determining unit 12b detects an abnormality ("YES" at Step S105), the mode-switch determining unit 12 switches the mode of the vehicle-status monitoring apparatus 1 to the abnormal mode (Step S107), and stores the information acquired from the detecting unit 11 in addition to the actual measurement data 15a (Step S108). Then, the display control unit 13 controls the display system 30 to display an image or a message to notify the status of the vehicle to the driver, and guides the driver to carry out a safe driving (Step S109).

As describe above, according to the present embodiment, when the vehicle-status monitoring apparatus 1 detects a result of measurement from the measurement system 20, an additional measure is provided to make a response to a case in which it cannot be determined that the vehicle is in an abnormal status, but there is a possible of an abnormality. In this case, a continuous monitoring is carried out to investigate whether the vehicle is in an abnormal status. Therefore, it is possible to determine whether the vehicle is in an abnormal status with a high precision.

Furthermore, according to the present embodiment, when it is determined that the vehicle is in an abnormal status, the measured value from the measurement system 20, which was a basis of the determination, is stored in a storing unit. Therefore, it is possible to carry out a repair process with respect to an abnormality of the vehicle in a quick and efficient manner. Moreover, based on a level of an impact or a status of the vehicle, an intervention, such as a speed restriction, is carried out when the level is high, and just a notification of an advice is carried out when the level is low.

According to the present invention, when a first determining unit determines that an impact value detected indicates an abnormal status of a vehicle, a second determining unit continues to monitor a status of the vehicle. Therefore, when it is determined that the vehicle is not in an abnormal status, but there is still a possibility that the vehicle becomes in an abnormal status, it is possible to carry out a further investigation to determined whether the vehicle is in an abnormal status with a high precision.

Furthermore, according to the present invention, the second determining unit continues to monitor the status of the vehicle only when the first determining unit determines that the there is a possibility that the vehicle is in an abnormal status. Therefore, it is possible to suppress a load to a unit required for continuing to monitor the status of the vehicle to a level of a necessity minimum.

Moreover, according to the present invention, a display unit displays a message that a mode of the vehicle is switched to a vehicle-status monitoring mode. Therefore, it is possible to notify a driver of the vehicle of a possibility that the vehicle becomes in an abnormal status to draw the driver's attention.

Furthermore, according to the present invention, a display unit displays a result of a determination whether the vehicle is in an abnormal status. Therefore, even if a driver of the vehicle does not determine that the vehicle is in an abnormal status, it is possible to obtain a result of the determination judged in the vehicle-status monitoring mode with a high precision.

Moreover, according to the present invention, the mode of the vehicle is switched to an abnormal mode when it is determined that the vehicle is in an abnormal status in the vehicle-status monitoring mode. Therefore, it is possible to secure a safety of the vehicle.

Furthermore, according to the present invention, a display unit displays a message that a driving of the vehicle should be restricted when it is determined that the vehicle is in an abnormal status in the vehicle-status monitoring mode. Therefore, it is possible to guide a driver of the vehicle to carry out a driving with a reduced speed for safety.

Moreover, according to the present invention, an impact value and driving information are stored in a storing unit when a mode of the vehicle is switched to the vehicle-status monitoring mode or the abnormal mode. Therefore, when the vehicle is taken to a dealer for a repair or a maintenance of the vehicle, it is possible to carry out a work of the repair or the maintenance quickly and efficiently.

Furthermore, according to the present invention, the status of the vehicle is changed to a status in which an impact value is easily acquired to continue to monitor the status of the vehicle when the mode of the vehicle is switched to the vehicle-status monitoring mode. Therefore, it is possible to determine whether the vehicle is in an abnormal status with a high precision.

Moreover, according to the present invention, when it is determined that an impact value detected indicates an abnormal status of a vehicle at a first determining step, a status of the vehicle is continuously monitored at a second determining step. Therefore, when it is determined that the vehicle is not in an abnormal status, but there is still a possibility that the vehicle becomes in an abnormal status, it is possible to carry out a further investigation to determined whether the vehicle is in an abnormal status with a high precision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for monitoring a status of a vehicle, the apparatus determining whether the vehicle is in an abnormal status by comparing an impact value detected by a detecting unit that detects an impact on the vehicle with a predetermined threshold value, the apparatus comprising:
   a first determining unit that determines whether the impact value detected is over at least one threshold value from among a plurality of threshold values; and
   a second determining unit that, when the first determining unit determines that the impact value is over the at least one threshold value, starts to continuously monitor a status of the vehicle during driving, and determines whether the vehicle is in an abnormal status.

2. The apparatus according to claim 1, further comprising a display control unit that controls, when the first determining unit determines that the impact value is over the at least one threshold value, a predetermined display unit to display a message indicating that a mode of the vehicle is in a vehicle-status monitoring mode.

3. The apparatus according to claim 1, further comprising a display control unit that controls, when the second determining unit makes a determination whether the vehicle is in an abnormal status, a predetermined display unit to display a message indicating a result of the determination.

4. The apparatus according to claim 1, wherein, upon determining that the vehicle is in an abnormal status, the second determining unit restricts a driving of the vehicle for safety.

5. The apparatus according to claim 1, further comprising a display control unit that controls, when the second determining unit determines that the vehicle is in an abnormal status, a predetermined display unit to display a message indicating that a driving of the vehicle should be restricted.

6. The apparatus according to claim 1, further comprising:
   a storing unit that stores the impact value detected and driving information on the vehicle; and
   a control unit that controls, when the first determining unit determines that the impact value is over the at least one threshold value or when the second determining unit determines that the vehicle is in an abnormal status, the storing unit to continue to store the impact value and the driving information.

7. The apparatus according to claim 1, further comprising a vehicle-status changing unit that changes, when the first determining unit determines that the impact value is over the at least one threshold value, the status of the vehicle to a status in which the impact value is easily acquired.

8. A method of monitoring a status of a vehicle, the method determining whether the vehicle is in an abnormal status by comparing an impact value detected by a detecting unit that detects an impact on the vehicle with a predetermined threshold value, the method comprising:
   a first determining that includes determining whether the impact value detected is over at least one threshold value from among a plurality of threshold values; and
   a second determining that includes starting to continuously monitor a status of the vehicle during driving, and determining whether the vehicle is in an abnormal status, when the first determining determines that the impact value is over the at least one threshold value.

9. The method according to claim 8, further comprising controlling, when it is determined that the impact value is over the at least one threshold value at the first determining, a predetermined display unit to display a message indicating that a mode of the vehicle is in a vehicle-status monitoring mode.

10. The method according to claim 8, further comprising controlling, when a determination whether the vehicle is in an abnormal status is made at the second determining, a predetermined display unit to display a message indicating a result of the determination.

11. The method according to claim 8, wherein the second determining further includes, when it is determined that the vehicle is in an abnormal status, restricting a driving of the vehicle for safety.

12. The method according to claim 8, further comprising controlling, when it is determined that the vehicle is in an abnormal status at the second determining, a predetermined display unit to display a message indicating that a driving of the vehicle should be restricted.

13. The method according to claim 8, further comprising:
    storing the impact value detected and driving information on the vehicle; and
    continuing, when it is determined that the impact value is over the at least one threshold value at the first determining or when it is determined that the vehicle is in an abnormal status at the second determining, to store the impact value and the driving information.

14. The method according to claim 8, further comprising changing unit, when it is determined that the impact value is over the at least one threshold value at the first determining, the status of the vehicle to a status in which the impact value is easily acquired.

* * * * *